United States Patent [19]

Keryvel et al.

[11] Patent Number: 5,170,483
[45] Date of Patent: Dec. 8, 1992

[54] SYSTEM HAVING CONSTANT NUMBER OF TOTAL INPUT AND OUTPUT SHIFT REGISTERS STAGES FOR EACH PROCESSOR TO ACCESS DIFFERENT MEMORY MODULES

[75] Inventors: Georges Keryvel, Versailles; Jean-Louis Thomas, Clamart; Claude Timsit, Fourquex, all of France

[73] Assignee: Bull S.A., Paris, France

[21] Appl. No.: 391,141

[22] Filed: Aug. 8, 1989

[30] Foreign Application Priority Data

Aug. 12, 1988 [FR] France ............... 88 10858

[51] Int. Cl.⁵ .......................... G06F 13/00
[52] U.S. Cl. .................... 395/800; 395/325; 364/228; 364/238.7; 364/243; 364/DIG. 1
[58] Field of Search ........... 395/375, 325, 275, 800; 364/DIG. 1

[56] References Cited

U.S. PATENT DOCUMENTS

| | | | |
|---|---|---|---|
| 3,566,363 | 2/1971 | Driscoll, Jr. | 340/172.5 |
| 3,742,466 | 6/1973 | Hamon et al. | 340/173 RC |
| 4,096,571 | 6/1978 | Vander Mey | 395/425 |
| 4,328,543 | 5/1982 | Brickman et al. | 395/325 |
| 4,475,155 | 10/1984 | Oishi et al. | 395/275 |
| 4,484,263 | 11/1984 | Olson et al. | 395/275 |
| 4,628,447 | 12/1986 | Cartret et al. | 395/725 |
| 4,689,738 | 8/1987 | van Wijk et al. | 395/800 |
| 4,858,108 | 8/1989 | Ogawa et al. | 395/275 |

FOREIGN PATENT DOCUMENTS 0014926  3/1980  European Pat. Off. .
0147857  10/1985  European Pat. Off. .

Primary Examiner—Thomas C. Lee
Assistant Examiner—Alpesh M. Shah
Attorney, Agent, or Firm—Weingarten, Schurgin, Gagnebin & Hayes

[57] ABSTRACT

A central unit for a data-processing system having a high degree of parallelism. This central unit includes a number of basic processors sending requests to a number of modules in receiving responses from those modules. To simplify the interconnection between the modules and the processors when their number increases, the invention is characterized wherein the requests sent from each processor are transmitted to the input of each of said modules via an input shift register, wherein the response coming from each of the said modules are transmitted to the input of each processor via an output shift register, wherein for any provided processor, the number of stages of said input shift register making it possible to access the modules is different for each of the modules and wherein for any processor, the total number of stages belonging to the input and output shift registers associated with one of the said modules is constant and independent of the module and processor in question.

9 Claims, 8 Drawing Sheets

SYSTEM HAVING CONSTANT NUMBER OF TOTAL INPUT AND OUTPUT SHIFT REGISTERS STAGES FOR EACH PROCESSOR TO ACCESS DIFFERENT MEMORY MODULES

The invention is in the realm of information processing systems and especially high-performance systems using vector units.

The invention concerns particularly a central unit architecture that can serve as a vector unit for this type of system.

To increase the performance of large scientific computers, one must multiply the number of processors so that they can work simultaneously. This method, called parallelization, thus makes it possible theoretically to achieve a total cycle time equal to the cycle time of a basic processor divided by the number of processors in the system. In reality, the performance also depends on the vectorization rate that the compiler can achieve for a provided application. This problem basically involves programming and compiling techniques that go beyond the framework of this invention. Consequently, in the following, we will disregard this question and concern ourselves basically with the physical architecture of central units that can do vectorized applications, at least partially.

The performance of a system also depends on the performance of the memories with which the basic processors must communicate.

The basic parameters for evaluating the performance of a memory are the access time and the cycle time. The access time is defined as the amount of time between when one of the processors sends a request and the time when an acknowledgement signal appears indicating that the request has been retrieved by the memory and a new request can be addressed. The cycle time defines the period of time between when a request is received by the memory and when the response is available in the memory's output register.

Current developments in the design of large computers require memories with increasingly large capacities. However, the performance of the memories matched with the processors must also be compatible with those of the processors. Thus, memories with the shortest possible access time and cycle time must be designed. But these conditions are hard to reconcile with increased memory capacity, for with the present technology, a memory's access time increases with its capacity.

To solve this problem, one standard solution is to use a memory made up of several modules, so each module has an access time less than a nonmodular memory with the same capacity would have. On the other hand, an interlacing technique may be used, in which successive or simultaneous requests sent by the processors are addressed successively or simultaneously to different modules in the memory.

However, this solution poses another problem, which is that of the connections between the processors and the various memory modules. In one early method known, a "crossbar" type interconnection network is used which allows connections between any processor and any module. This solution is, however, limited by an increase in the complexity of the interconnection device when the rate of parallelization increases. Indeed, a "crossbar" network implies a centralization of paths which has the following unfavorable effects:

an increase in the connectors (all the more important when the paths are wide);

a lengthening of the connections when the size of the memory increases, with an unfavorable effect on throughput and access time;

difficulty integrating, since the percentage of connections is increased in comparison with the associated logic functions;

the need for centralized command management which entails difficulties in the management of data flow and conflicts;

an absence of modularity;

difficulty in using redundancies to permit reconfiguration.

Another known solution that does not have these drawbacks is to use a bus-type connection between the processors and the different modules. In this case, there is one memory controller per module, and each controller is equipped with an input register and an address decoder. To increase the flow, two distinct buses are used to transport the requests and the responses so that, in the interlaced mode, the total access time of the memory is theoretically equal to the access time of one module divided by the number of modules.

However, this solution has the following disadvantage. The response to a request addressed to a particular module in the memory is available in the output register of the module after a period of time that corresponds to the propagation time for the request from one of the processors to the module, plus the cycle time of the module. Now, the propagation time and the cycle time can vary from one module to another. These differences grow particularly sharp when the number of processors and the number of modules increase, for it then becomes possible for the responses to two requests addressed to two different modules to appear simultaneously on the output bus.

The invention is aimed at eliminating this disadvantage by making sure that the responses sent from the different modules are transported in succession toward the different processors in the same order in which the corresponding requests are sent and are accepted by the modules.

To be more precise, the invention has as its aim a central unit for an information processing system, with said unit including several processors associated with several memory modules designed to receive requests from said processors, with said requests taking the form of command, address and, possibly, data signals, with each module including means for decoding said requests appearing at its input and means for providing signals in response to said requests, with said central unit characterized by the fact that the requests coming from each processor are transmitted to the input of each of the said modules by an input shift register, by the fact that the responses coming from said modules are transmitted to the input of each processor by an output shift register, by the fact that for any provided processor, the number of stages of said input shift register enabling it to access the modules is different for each of the modules ($MM_j$) and by the fact that for any one processor the total number of stages that go with the input and output shift registers associated with one of said modules is constant and independent of the module and the processor in question.

The invention permits a simple design, in which the central unit is characterized by the fact that it is comprised of one single input shift register and one single output shift register, that each processor and each module is associated with one stage of said input shift register and with one stage of the output shift register, that the output of each processor is connected to the output of the associated stage of the input shift register, that the output of each module is connected to the output of the associated stage of the output shift register, that the input of each processor is connected to the output of the associated stage of the output shift register and that the input of each module is connected to the output of the associated stage of the output shift register.

The preceding solution makes it possible to obtain the performance sought in the interlaced mode. However, it is also useful to be able to function in any mode whatsoever, and consequently, to provide a mechanism that prevents a request from addressing a module that has just been addressed by a previous request less than a certain minimum time before, this minimum time depending on the module's access time. This problem also exists in the system with a bus as mentioned above. To overcome this difficulty, usually a window system managed by the processors is provided to prevent this type of conflict.

One can also provide a time-fill inhibiting circuit that prevents a request from being addressed to a module and succeeding the first request addressed to the same module after less than a certain period of time, which is a function of the total access time for each module-processor pair in the system.

Although these solutions solve the problem of a collision between successive requests that are too close together, the result is to complicate the design of either the processors or the inhibiting circuit. This solution also has the drawback of entailing a large total system cycle time.

Thus, in one version of the invention, the preceding problem is solved by the following principle: the input shift register is relooped onto itself and as each request comes from one of the processors, there is an indicator transported with the request that signals that the request is valid. So long as the request has not been accepted by one of the memory modules, the request remains present in the shift register, but as soon as the request is accepted, this indicator assumes another value, signifying that the request has been accepted by one of the modules. Thus, depending on the value of this indicator, each processor will be able to determine whether it can send a new request on the input shift register.

The invention also has as its aim a central unit characterized by the fact that each module is associated with a request acknowledgement circuit to match each request with a request indicator transported by said input shift register, with said request acknowledgement circuit forcing said request indicator to a first set value when an acknowledgement signal is provided by said module indicating that it accepts the request present at its input and by the fact that each stage of the input shift register associated with a processor has its output connected to a request control circuit associated with said processor, and said request control circuit includes a request selection device authorizing the transfer to the stage of the input shift register downstream from said processor of either a new request available in the output of said processor, if the value of said indicator contained in said stage is equal to said first set value, or of a request contained in said stage associated with said processor in the opposite case, the request indicator associated with any new request transferred to said stage downstream being forced to a second set value by said request control circuit, and by the fact that the output of the first stage of the input shift register is connected to the input of the last stage of said input shift register by a request acknowledgement circuit or by the request control circuit associated with said primary stage.

A problem analogous to the preceding one also arises when a single output shift register is used to transport the responses from the modules. Indeed, it can produce situations where a response contained in the stage of the shift register placed upstream from a module comes in conflict with a response available in the output of that module.

One solution might be to provide at the processor stage an address control mechanism to prevent this type of situation in all cases. But this solution complicates the work of the processors, which hurts performance.

In another version of the invention, this problem is solved in a way that is similar to the solution to the preceding problem. For this, the invention also concerns a central unit, characterized by the fact that each processor is associated with a response acknowledgement circuit to pair each response with a response indicator transported by said output shift register, said response acknowledgement circuit forcing said response indicator to a first set value when a response acknowledgement signal is provided by said processor indicating that it accepts the response present at its input and by the fact that the output of this stage of the output shift register, which is associated with a module, is connected to a response control circuit (MC$_j$), with said response control circuit including a response selection device authorizing the transfer into the stage of the output shift register placed downstream from said module of either a response available in the output of said module if the value of said response indicator contained in said stage is equal to said first set value, or of the response contained in said stage associated with said module in the opposite case, with the response indicator associated with any new response transferred into said stage downstream being forced to a second set value by said response control circuit and by the fact that the output of the first stage of the output shift register is connected to the input of the last stage of the said output shift register by the response acknowledgement circuit or by the response control circuit associated with said primary stage.

Other characteristics and design details of the invention will be detailed in the following description in relation to the figures, where:

DETAILED DESCRIPTION

Figure 1:
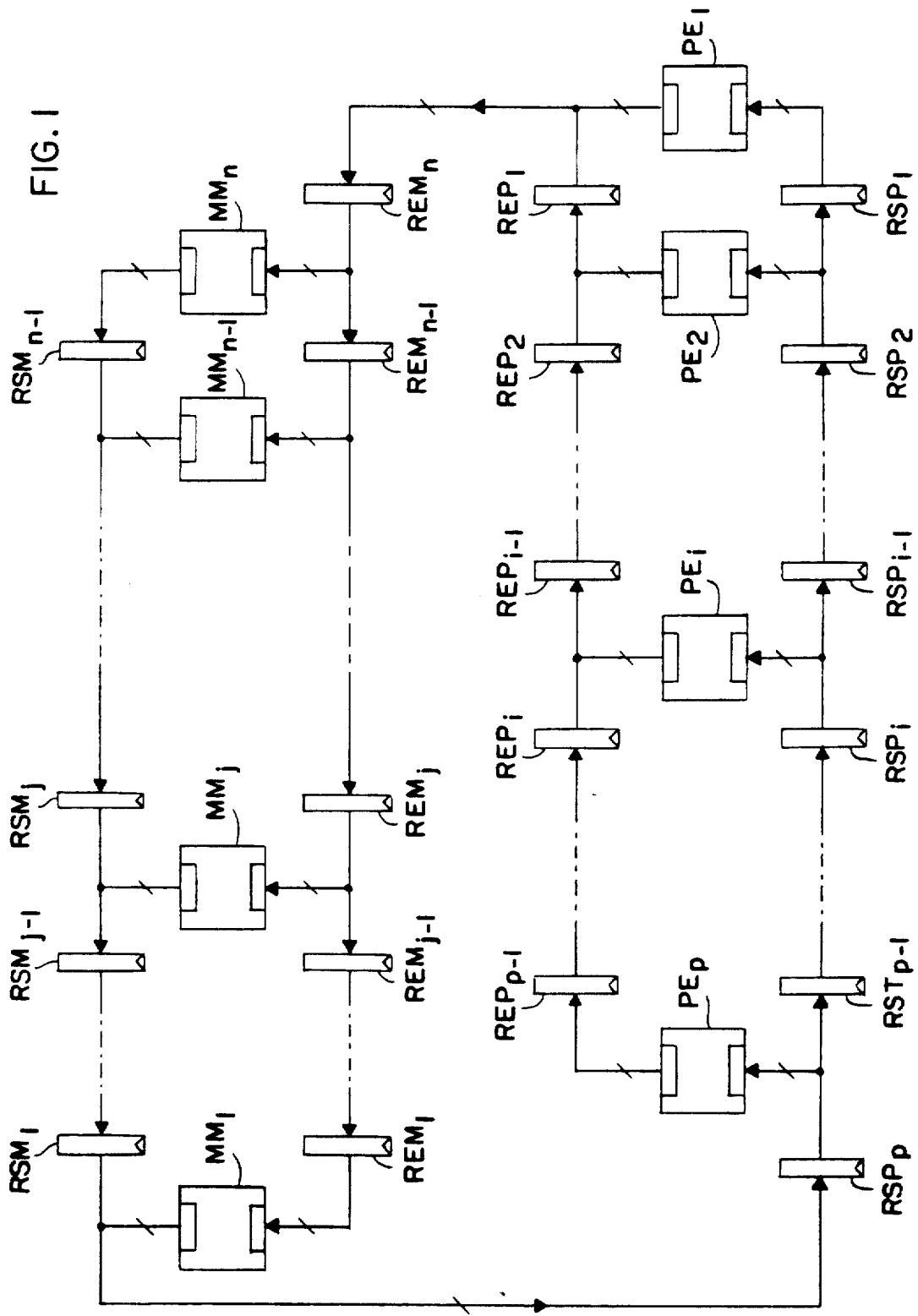
FIG. 1 shows a design schematic for this invention.

FIG. 1 represents a central unit according to the invention in a simplified design mode.

The central unit includes a large number of basic processors $PE_1, PE_2, \ldots PE_i, \ldots PE_p$ and a large number of memory modules $MM_1, \ldots MM_j, \ldots MM_{n-1}, MM_n$.

Each processor $PE_i$ includes an output interface to issue destination requests from one of the memory modules. Usually, one request corresponds to one read or write command in the module in question.

Generally, a request consists, in parallel, of a function code that defines the operation to be performed by the memory, address information and, in the case of a read, data to be written. The request can also include a tag of origin that serves to identify the request or the processor that issued the request. These processors can be part of the vector unit of a vector calculator. They can also belong to the scalar units or even make up the system's input-output processors.

Each memory module $MM_j$ includes an input interface to receive the requests issued by the processors. The modules' input interface generally includes an input register that serves to memorize the requests received, as well as an address decoder to select this module, for example, in response to the most significant bits of the address received.

Each module also consists of an output interface with an output register that serves to store responses ready for one of the processors.

A response consists of data read, in the case of a read, or of an error report that serves to inform the processors whether or not the operation requested has been correctly performed. A response also includes a destination tag that serves to identify the requesting processor. Generally, the tags of origin for a request and the destination tags for the corresponding response are identical.

Each processor $PE_i$ includes an input interface comprised of a tag decoder and a register to receive the responses issued by the memory modules.

According to the invention, each request from one of the processors $PE_i$ can access various memory modules through an input shift register consisting of the stages $REM_1, \ldots REM_{j-1}, \ldots REM_j, \ldots REM_{n-1}, REM_n, REP_1, REP_2, \ldots REP_{i-1}, REP_i, \ldots REP_{p-1}$. Each stage, respectively, $REM_j$ or $REM_i$ of the input shift register has its output connected respectively to the input of a corresponding module $MM_j$ or to the output of a corresponding processor $PE_i$ and to the input of the downstream stage, respectively $REM_{j-1}$ or $REP_{i-1}$.

In the same way, the central unit includes an output shift register made up of stages $RSP_1, RSP_2, \ldots RSP_{i-1}, RSM_{n-1}, \ldots RSP_{p-1}, RSP_p, RSM_1, \ldots RSM_{j-1}, RSM_j, \ldots RSM_{n-1}$. Each stage, respectively, $RSM_j$ or $RSP_i$ of the output shift register has its output connected respectively to the output of a corresponding module $MM_j$ or to the input of a corresponding processor $PE_i$ and to the input of the stage downstream, respectively $RSM_{j-1}$ or $RSP_{i-1}$.

Each stage of the input and output shift registers receives on its clock input a clock signal that comes from a circuit not shown.

We are now going to describe how the device in FIG. 1 works. We shall assume, first of all, that the processors are functioning in a parallel mode, for example, in the case of a vector operation, and the memory modules are addressed in the interlaced mode. In this case, each basic processor $PE_i$ can simultaneously command, at each clock cycle, a read or write operation and thus present a corresponding request at the output. During vector calculations, requests are normally justified; that is, the first processor $PE_1$ addresses itself to the first module $MM_1$, the second processor $PE_2$ addresses itself to the second module $MM_2$, etc. Each processor $PE_i$ will then load the stage $REP_{i-1}$ of the input shift register that is located directly downstream from that processor. At each clock pulse applied to the register, each request is shifted to the following stage. As we have n memory modules, after n shifts, the request of processor $PE_1$ will appear at the input of module $MM_1$, the request from processor $PE_2$ will appear at the input of module $MM_2$, etc. So the modules will be able to execute the requests addressed to them in parallel. After a period of time equal to the cycle time of the modules, the responses will normally be available in the output of those modules and can be put into the output shift register in the same order as the requests in the input shift register. For example, the response corresponding to the request addressed to module $MM_j$ will be put into the stage $RSM_{j-1}$ downstream from the output shift register. If p is the number of processors, the first request coming from module $MM_1$ will be available at the input of processor $PE_1$ after p shifts, that is, after p clock pulses.

We can also say that with this organization, the total access time for a data bit is independent not only of the processor that made the request but also of the destination module.

Note that the choice of the number of processors and the number of modules must take into account the respective performances of each processor and each module. Thus, if the cycle time of a processor is near that of a memory module, one should choose a number of modules equal to the number of processors. On the other hand, if the processors perform more than the modules, each processor can send requests at a rate higher than that at which the modules can respond. Then, a number n of modules equal to a multiple of the number p of processors should be chosen.

When the central unit does not function in the parallel mode, requests from the processors can be addressed to the modules in any order at all. Now, the cycle time of the shift registers is normally much less than the access time of each module. So it is necessary to avoid having two requests too close together being addressed to the same module. Similarly, it is necessary to avoid having a response from a module to come into conflict with a response placed in the stage located upstream from that module. These situations can be avoided by an address management mechanism commanded in the processors. However, this solution has the disadvantage of complicating compilation and making the work of the processors harder, which could hurt performance.

Figure 2:
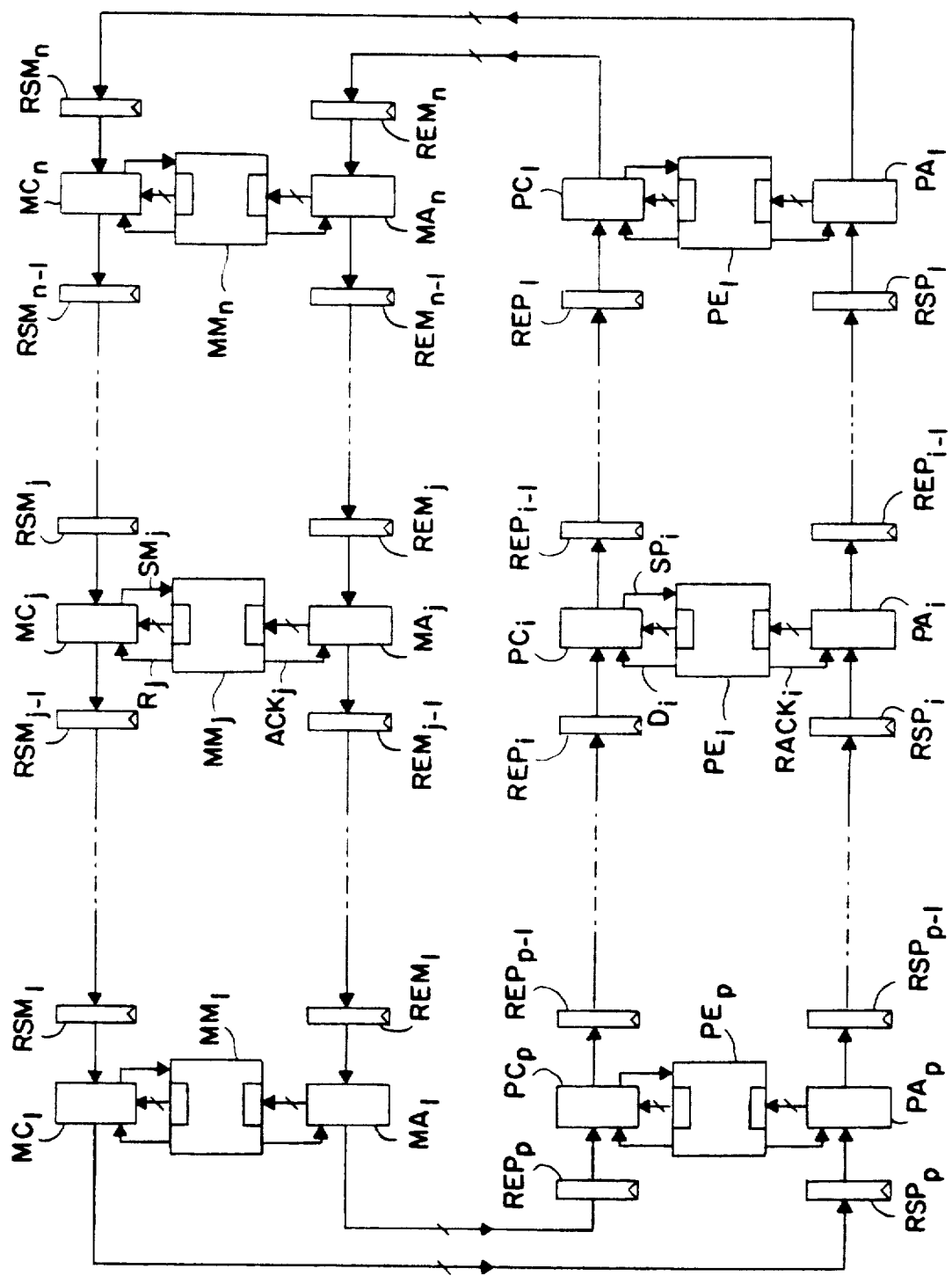
FIG. 2 shows a design variation of this invention.

The design variation shown in FIG. 2 makes it possible to solve this problem without the disadvantages previously mentioned. In FIG. 2, we find, with the same reference signs, the memory modules, the input and output shift registers and the processors. FIG. 2 is different from FIG. 1 in the following ways.

First of all, the input shift register is supplemented by an additional stage $REP_p$ placed downstream from the first stage $REM_1$ of the input shift register.

Moreover, each memory module $MM_j$ is matched with a circuit $MA_j$, called a "response acknowledgement circuit," whose input is connected to the output of the stage $REM_j$ upstream from the input shift register and whose output is connected to the input of the stage $REM_{j-1}$ downstream. Another acknowledgement circuit output $MA_j$ is connected to the input of the associated module $MM_j$. The acknowledgement circuit $MA_j$ also receives an acknowledgement signal $ACK_j$ provided by the module $MM_j$ to indicate whether a request is accepted by that module.

Lastly, each processor $PE_i$ is matched with a circuit $PC_i$ called a "request control circuit" whose input is connected to the output of the stage $REP_i$ upstream from the input shift register and whose output is connected to the input of the stage $REP_{i-1}$ downstream. The request control circuit $PC_i$ includes an input connected to the output of the corresponding processor $PE_i$. The request control circuit $PC_i$ also receives a signal $D_i$ from the processor $PE_i$ indicating that the processor is ready to send a new request. Finally, this circuit $PC_i$ gives the processor $PE_i$ a signal $SP_i$ which will be defined later. Although it cannot be seen in FIG. 2, each stage $REP_i$, $REM_j$ of the input shift register includes, besides the flip-flop assigned to the request signals, an additional flip-flop and connections between the stages have an extra line assigned to this flip-flop.

The purpose of this flip-flop and this extra line is to be able to transport a binary indicator B whose logic value indicates whether the associated request is valid, that is, whether or not it has been retrieved by the memory modules.

The precise functioning of the acknowledgement circuits and the request control circuits will be explained in more detail with reference to FIGS. 3 and 4. Nonetheless, the work of the input shift register, according to the version in FIG. 2, can be outlined broadly at this point.

Assuming that a request sent from a processor $PE_i$ can be put into the input shift register, the request control circuit $PC_i$ sends the request per se to its output, along with the indicator B whose logic value indicates the presence of a valid request, that is, one not yet accepted by the memory. This request and its indicator move along in the shift register until they have reached the destination module $MM_j$ identified by the address. When the request arrives in the stage $REM_j$ upstream from the module $MM_j$, the address associated with the request is recognized by this module and if it is available, it transmits an acknowledgement signal $ACK_j$ to the acknowledgement circuit $MA_j$. If, on the contrary, the module is not available, it sends an acknowledgement signal $ACK_j$ with a value supplementary to the preceding. At the next clock time, the request is also transmitted to the stage downstream, but the indicator B keeps its initial value. The request and its indicator then move along in the input shift register and because of the extra stage $REP_p$, the same request can reappear at the input of the destination module $MM_j$ after a complete turn in the shift register.

When one of the processors $PE_i$ is ready to send a request, it sets its signal $D_i$ at a first set value. This signal is received by the corresponding request control circuit $PC_i$ which has means of testing the logic value of the indicator B contained in the stage $REP_i$. If the value of the indicator B indicates a valid request, the request and the indicator contained in the register $REP_i$ are transmitted unchanged to the stage $REP_i-1$ located downstream. $PC_i$ signals by $SP_i$ to processor $PE_i$ that its request is not authorized to be put in the shift register. If, on the other hand, the indicator contained in the register $REP_i$ indicates an invalid request, the request of the processor $PE_i$ is put into the stage $REP_{i-1}$ through the circuit $PC_i$. The processor is then informed that its request is accepted by the signal $SP_i$ provided by the circuit $PC_i$.

We see that this solution solves the problem of conflicts between requests posed earlier, for in a case where two requests too close together appear at the same memory module, the second request, which cannot be retrieved by that module, continues to move along in the shift register. It will appear at this module again after a shift number equal to the total number of modules and processors and a new attempt to retrieve will be made.

Compared to FIG. 1, the design in FIG. 2 also has changes in its output shift register.

Each module $MM_j$ is matched to a circuit $MC_j$ called a "response control circuit" connected to the output of the corresponding module. Each response control circuit $MC_j$ has another input connected to the output of the stage $RSM_j$ located upstream from the associated module $MM_j$, and its output is connected to the input of the stage $RSM_{j-1}$ downstream. Each response control circuit $MC_j$ also receives a signal $R_j$ from the module whose logic value indicates the presence or absence of a response available in the output of the module.

Similarly, each processor $PE_i$ is associated with a circuit $PA_i$ called a "response acknowledgement circuit" connected to the input of the corresponding processor. Each response acknowledgement circuit $PA_i$ has an input connected to the output of the stage $RSP_i$ located upstream from the associated module $PE_i$ and to another output connected to the input of the stage $RSP_{i-1}$ located downstream. Each response acknowledgement circuit $PA_i$ receives an acknowledgement signal $RACK_i$ from the associated processor whose logic value indicates whether or not the response has been accepted by the processor.

The response acknowledgement circuit output $PA_1$ associated with the first processor $PE_1$ is connected to the input of the response control circuit $MC_n$ associated with the last module $MM_n$ through an extra stage $RSM_n$.

Each response control circuit $MC_j$ gives the associated module $MM_j$ a signal $SM_j$ which will be defined later.

Like the input shift register, each stage $RSM_j$, $RSP_i$ of the output shift register includes an extra flip-flop (not shown) and the connections linking the stages between them includes an extra line. This extra flip-flop and this extra line make it possible to transport a response indicator $B_r$ with a first logic value when the associated response has been accepted by one of the processors and a second logic value when this response has not been accepted.

The output shift register in FIG. 2 works in the following way. When a valid response, that is, one not yet accepted by one of the processors, appears in the stage $RSP_i$ associated with the destination processor for this response and this response can be accepted by the processor, the latter sends to the response acknowledgement circuit $PA_i$ a signal $RACK_i$ with a first logic value indicating that the response has been accepted. The response acknowledgement circuit $PA_i$ then transmits the response to the stage $RSP_{i-1}$ downstream while forcing the response indicator $B_r$ to a first logic value.

If the response is not accepted by the processor, it sends a signal $RACK_i$ with a second logic value, and the response acknowledgement circuit $PA_i$ puts the output of the stage $RSP_i$ in direct communication with the input of the downstream stage $RSP_{i-1}$.

When a module $MM_j$ has a response ready, it sends a signal $R_j$ with a first logic value to the associated response control circuit $MC_j$. If the indicator $B_r$ contained in the stage $RSM_j$ located upstream from the module has the first set logic value, the response control circuit $MC_j$ puts the associated output module in communication with the input of the stage $RSM_{j-1}$ located downstream. Simultaneously, the response control circuit $MC_j$ forces the associated response indicator $B_r$ to a second logic value and transmits it to the corresponding flip-flop of the stage $RSM_{j-1}$ downstream.

If the indicator contained in the stage located upstream from the module $MM_j$ has a value equal to the second logic value, the response available in the output of the module is blocked and the contents of the stage $RSM_j$ upstream are transmitted without any change to the stage $RSM_{j-1}$ downstream.

When a response available in a module $MM_j$ has been put into the output shift register, the module is told by the signal $SM_j$.

The output shift register, according to FIG. 2, thus makes it possible to avoid a collision between two responses, one coming from a memory module, the other coming from the stage upstream from that module.

The preceding description shows that the processors and the memory modules play a totally symmetrical role. Indeed, in the case of requests, the processors play the role of transmitter and the modules that of receiver. Conversely, for responses, the roles are reversed and the modules then play the role of transmitters, while the processors play the role of receivers.

It should be noted that the total access time to a memory module increases with the number of stages in the input shift register. However, the set-up shown in FIGS. 1 and 2 is not the only one possible. Indeed, one may choose a different distribution of processors and memories along the shift registers. The choice of distribution will be a function of the respective cycle times of the basic processors and the memory modules.

If, for example, the cycle time of a processor is near the access time of a memory module, it can be an advantage to alternate the placement of processors and modules. In this case, the total access time is reduced, for a request coming from a processor can be addressed to the neighboring module without having to circulate the whole length of the input shift register.

Generally, it is also possible to alternate groups of processors and groups of modules, with the respective numbers of processors and modules by group being a function of the cycle time of the processors and the access time of the modules.

Referring to FIGS. 3 to 6, we are now going to provide a more detailed description of the request control $PC_i$, request acknowledgement $MA_j$, response control $MC_j$ and response acknowledgement $PA_i$ circuits.

Figure 3:
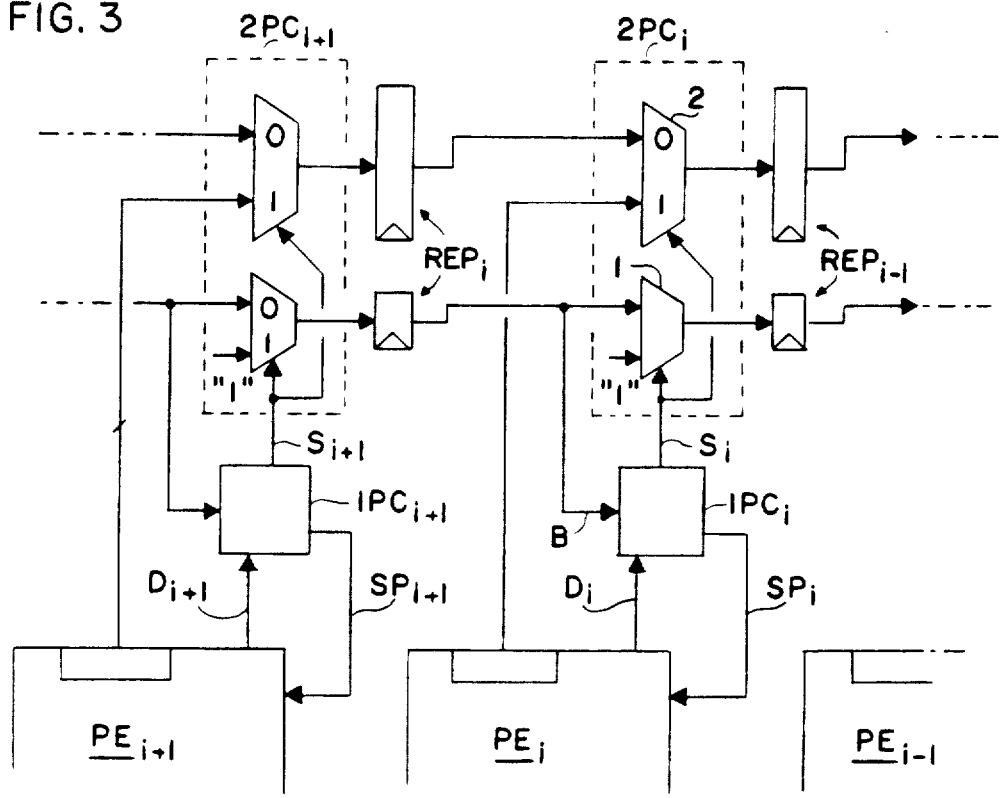
FIGS. 3, 4, 5 and 6 show design details of the version in FIG. 2.

FIG. 3 shows the request control circuit $PC_i$ which is made up of a selection circuit $2PC_i$ and a command circuit $1PC_i$. The selection circuit $2PC_i$ includes a primary dual-input multiplexer 1, with a primary input receiving a fixed logic signal and the other input connected to the flip-flop in the stage $REP_i$ containing the indicator B. A second dual-input multiplexer 2 has its primary input connected to the output of the processor $PE_i$ and its secondary input connected to the outputs of the other flip-flops of the stage $REP_i$. The two multiplexers 1 and 2 are commanded by a signal Si coming from the command circuit $1PC_i$. The command circuit $1PC_i$ receives the indicator B contained in the stage $REP_i$ and the signal $D_i$ coming from the processor $PE_i$.

In the design example shown, we have assumed that the indicator is a binary element which, when it assumes the logic value 1, indicates that the request is valid, i.e., not yet accepted by the memory. When the indicator assumes the logic value 0, the associated request has been accepted by the memory. Elsewhere, we have assumed that when the signal Si assumes the logic value 1, the multiplexers 1 and 2 put their upper input in communication with their output. Lastly, we will assume that the signal $D_i$ assumes the logic value 1 when a request is present in the output of the processor.

The request control circuit works in the following way. The control circuit $1PC_i$ sends the signal $S_i$ with the logic value 1 when the indicator B has the logic value 0 and when the signal $D_i$ has the logic value 1. The signal $S_i$ assumes the logic value 0 in the opposite cases. Thus, when $S_i$ is equal to 1, the request present in the output of the processor is transmitted to the output of the multiplexer 2 and simultaneously the indicator B assumes the logic value 1 in the output of the multiplexer 1. If $S_i$ is equal to 0, the contents of the stage $REP_i$ are then present at the outputs of the multiplexers 1 and 2.

A signal $SP_i$ linked logically to the signal $S_i$ is transmitted to the processor $PE_i$ to tell it whether or not its request has been put into the input shift register.

The design which has standard logic circuits in the command circuit $1PC_i$ will not be described in more detail because it presents no difficulty for the expert. However, it may be noted that technology adapted to the performance of the shift register should be chosen.

Figure 4:
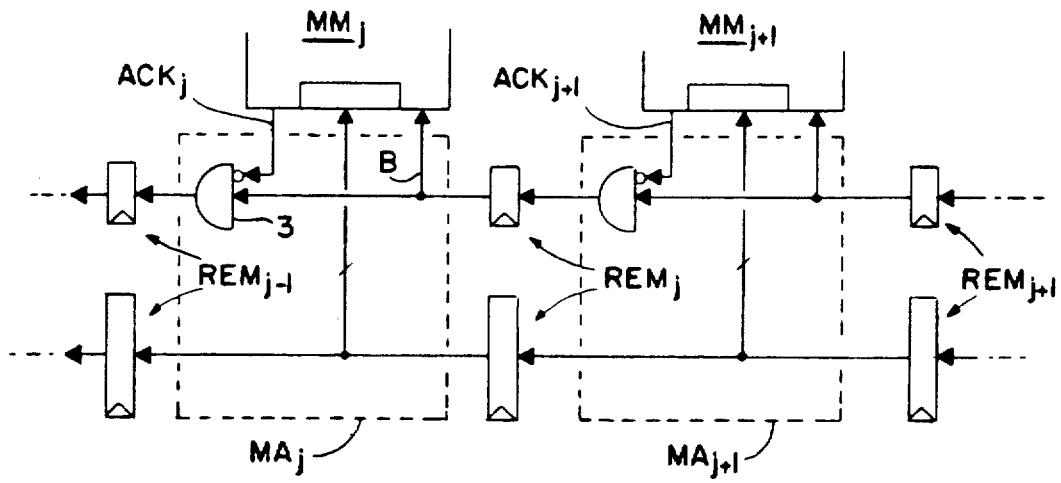

The acknowledgement circuits $MA_j$ and $MA_{j+1}$ associated with the two modules $MM_j$ and $MM_{j+1}$ are shown in FIG. 4. The acknowledgement circuit $MA_j$ associated with the module $MM_j$ consists simply of a dual input logic gate 3 whose primary input receives the acknowledgement signal $ACK_j$ from the associated module and whose secondary input is connected to the output of the flip flop of the stage upstream assigned to the indicator. The output of the gate 3 is connected to the input of the flip flop of the stage downstream assigned to the indicator.

The circuit is identical for the circuit $MM_{j+1}$ of the stage upstream.

In operation, when a request is addressed to the module $M_j$ and this request is present in the register $REM_j$, if the request is valid, that is, if the indicator B contained in this register has the logic value 1 and if the memory is available, the memory retrieves the request and provides an acknowledgement signal $ACK_j$ with the logic value 1. The logic gate 3 then provides the logic value 0 in input.

If an invalid request, that is, B equals 0, is contained in the register $RE_{n-1}$, this request is put in direct communication with the stage $REM_{j-1}$ downstream with no change in the indicator B.

Of course, the stage upstream could also be a processor without entailing any modifications in the circuit $MA_j$.

Figure 5:
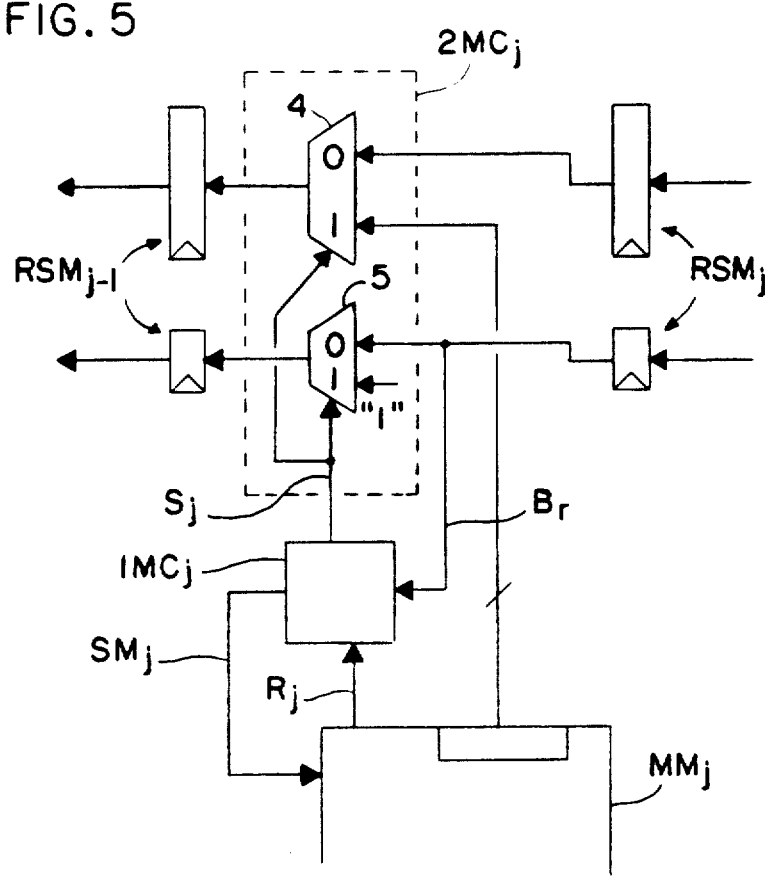

FIG. 5 shows only the response control circuit $MC_j$ associated with the module $MM_j$, since the circuits associated with the other modules are identical.

Like the request control circuit, the response control circuit $MC_j$ consists of a selection circuit $2MC_j$ and a command circuit $1MC_j$. The selection circuit $2MC_j$ includes two dual-input multiplexers 4 and 5. The primary input of the first multiplexer 4 is connected to the output of the part of the stage $RSM_j$ assigned to the response per se. The secondary input of the multiplexer 4 is connected to the output of the module $MM_j$. The primary input of the second multiplexer 5 is connected to the output of the flip-flop of the stage $RSM_j$ assigned to the response indicator $B_r$. Its secondary input stays at logic value 1.

The command circuit $1MC_j$ is connected at its input to the output of the flip-flop of the stage $RSM_j$ containing the response indicator $B_r$. The circuit $1MC_j$ also receives the signal $R_j$ from the module $MM_j$. We are assuming that the signal $R_j$ assumes the logic value 1 when a request is available in the module $MM_j$. The output $S_j$ of the circuit $1MC_j$ is connected to the command input of the two multiplexers 4 and 5. When the signal $S_j$ has the logic value 1, the multiplexers 4 and 5 put their lower input in communication with their output. The command circuit $1MC_j$ is designed so that when the signal $R_j$ has the logic value 1 and the indicator $B_r$ has the logic value 0, the signal $S_j$ assumes the logic value 1, thus authorizing the transfer of the response present in the output interface of the module $MM_j$ into the stage $RSM_{j-1}$ downstream. Simultaneously, the indicator $B_r$ provided at this stage assumes the logic value 1.

If the response indicator $B_r$ contained in the stage $RSM_j$ has the logic value 1, meaning that the response is valid, the command circuit $1MC_j$ provides a signal $SM_j$ to the module $MM_j$ to inform that module that the response cannot be put into the response shift register. Moreover, the signal $S_j$ assumes the logic value 0 and the request contained in the stage $RSM_j$ is integrally transferred into the register $RSM_{j-1}$ downstream. The result is that the response indicator put into the register downstream keeps the logic value 1. Of course, if no response is available in the module $MM_j$, the signal $R_j$ then assumes the logic value 0 and the signal $S_j$ assumes the logic value 0, thus authorizing the transfer, with no change, of the request and the indication contained in the stage $RSM_j$ to the stage $RSM_{j-1}$ downstream.

Figure 6:
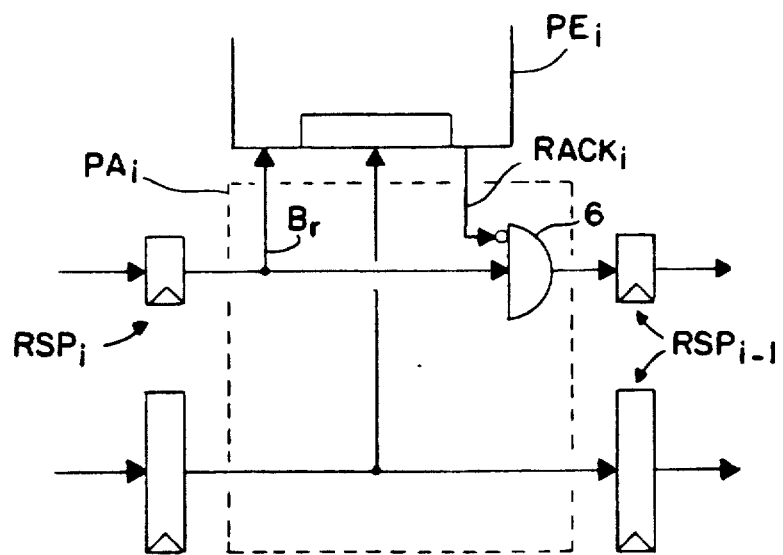

FIG. 6 shows a design mode for the response acknowledgement circuit $PA_i$ associated with the processor $PE_i$.

The response acknowledgement circuit $PA_i$ includes basically a logic gate 6 that receives at its primary input the indicator $B_r$ contained in the stage $RSP_i$ of the output shift register. The gate 6 receives at its secondary input the signal $RACK_i$ sent from the processor $PE_i$. The output of the gate 6 is connected to the input of the stage downstream $RSP_{i-1}$ of the response shift register.

In accordance with the practice previously explained, when the indicator $B_r$ has the logic value 1, this means that the associated response is valid, that is, that it has not been accepted by the processor.

We are also assuming that the signal $RACK_i$ assumes the logic value 1 when the processor $PE_i$ accepts a valid request.

Taking this practice into account, the response acknowledgement circuit works in the following way. When a response contained in the register $RSP_i$ is addressed to the processor $PE_i$ and is associated with a response indicator $B_r$ whose logic value is equal to 1, this means that this valid response should be retrieved by the processor. If such is the case, the signal $RACK_i$ provided by the processor assumes the logic value 1 and the circuit 5 provides at its output the logic value 0. In the opposite case, the signal $RACK_i$ has the logic value 0 and the output of the circuit 6 assumes the logic value 1, meaning that the request has not been accepted by the processor. If, on the other hand, the indicator $B_r$ contained in the register $RSP_i$ has the logic value 0, the output 6 also assumes the logic value 0.

We have seen in the preceding that the request control circuits or response control circuits require the reading of indicators placed in the registers associated with the processors or in the modules, as well as the activating of multiplexers. Now, if the shift register is functioning at a very high frequency, it becomes difficult to design control circuits that are fast enough to follow the rhythm of the shift. It is therefore a good idea to provide an advance mechanism that makes it possible for those controllers to determine the conditions for transferring requests or responses with an advance clock interval.

Figures 7, 8:
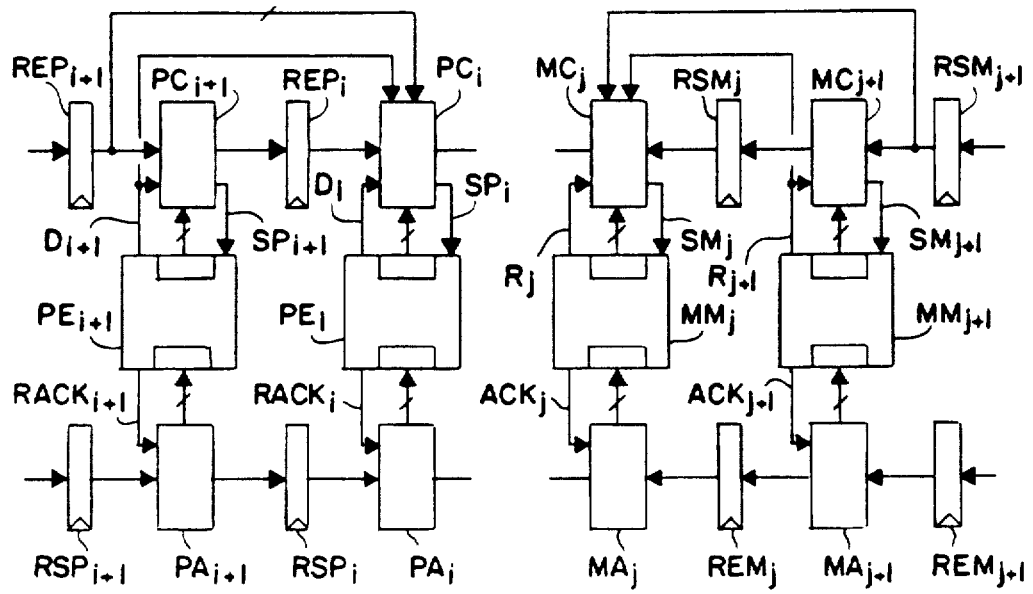
FIGS. 7, 8, 9 and 10 show design details for a second version of the invention.
Figures 9, 10:
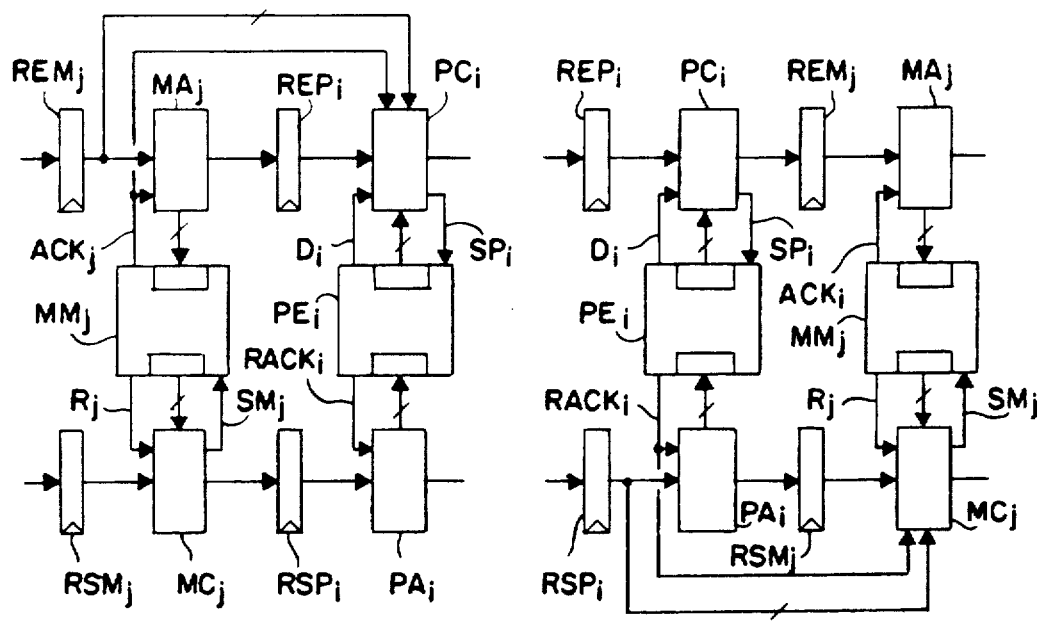

FIGS. 7 to 10 show a design variation permitting this advance notice. FIG. 7 shows a case where a processor $PE_i$ is placed immediately downstream from another processor $PE_{i+1}$. FIG. 8 shows a case where a module $MM_j$ is placed immediately downstream from another module $MM_{j+1}$. FIG. 9 shows a case where a processor $PE_i$ is placed immediately downstream from a module $MM_j$. Lastly, FIG. 10 shows a case where a module $MM_j$ is placed immediately downstream from a processor $PE_i$. In FIGS. 7 to 10, we find, with the same references, the elements already shown in FIG. 2. However, the control circuits have modified functions and include extra inputs which are connected to the outputs of the stage located upstream from the preceding module or processor and at the acknowledgement or request output of that preceding module or processor.

In the case provided in FIG. 7, the processor $PE_i$ is preceded by another processor $PE_{i+1}$. The request control circuit $PC_i$ is connected to the output of the stage $REP_{i+1}$ of the input shift register. This controller also receives the signal $D_{i+1}$ coming from the processor $PE_{i+1}$.

The request controller $PC_i$ is designed so as to authorize the transfer of a request from the processor $PE_i$ into the input shift register only when no valid response is present upstream from the processor $PE_{i+1}$ and provided that no request is present in the output of that processor. This condition can be easily detected by means of logic circuits that are sensitive to the indicator B contained in the stage $REP_{i+1}$ and to the signal $D_{i+1}$ indicating that a request is pending in the processor $PE_{i+1}$.

The situation is analogous in the case shown in FIG. 8 which concerns responses. The response control circuit $MC_j$ associated with the module $MM_j$ authorizes the transfer of a response available in this module when no valid response is present upstream from the preceding module $MM_{j+1}$ and when no response is available in that module. This condition is determined by the circuit $MC_j$ as a function of the response indicator $B_r$ contained in the stage $RSM_{j+1}$ and of the signal $R_{j+1}$ indicating that a response is available in the module $MM_{j+1}$.

In the case of FIG. 9, the processor $PE_i$ is placed downstream from a module $MM_j$ and the request control circuit $PC_i$ associated with the processor $PE_i$ is connected to the output of the stage $REM_j$ associated with the module $MM_j$. The circuit $PC_i$ also receives the signal $ACK_j$ provided by the module $MM_j$. The request control circuit $PC_i$ is then designed so that a request coming from the processor $PE_i$ is authorized to be put into the input shift register when a request contained in the stage $REM_j$ is not valid ($B_r=0$) or when that request is valid, when the signal $ACK_j$ indicates that this request will be accepted by the module $MM_j$, since it is addressed to that module, and that module is available.

Lastly, in the case in FIG. 10, the response control circuit $MC_j$ associated with the module $MM_j$ receives the indicator $B_r$ contained in the stage $RSP_i$ associated with a processor $PE_i$ placed upstream from that module. The signal $RACK_i$ coming from the processor $PE_i$ is also applied to the input of the response controller $MC_j$. The response control circuit $MC_j$ authorizes entry into the response shift register of a response available in the output of the module $MM_j$ when the response contained in the stage $RSP_i$ is not valid ($B_r=0$) or when that response is valid, when the signal $RACK_i$ indicates that that response will be accepted by the processor $PE_i$, since it is addressed to that processor and that processor is available.

The design of the request and response control circuits in this version is entirely within the scope of the expert in view of the explanations already provided. It is therefore unnecessary to provide a more detailed description of them.

On the other hand, it should be noted that the design modes described thus far assume that the input interface of the modules and processors include decoding circuits sensitive to the most significant bits of the address or to the tag received to command the retrieval of the request or the response and to provide the corresponding acknowledgement signals $ACK_j$, $RACK_i$. However, the invention is not limited to these special cases and equivalent solutions fall within the framework of the invention.

For example, memory modules that have input interfaces without decoders and without acknowledgement circuits could also be chosen. These functions should then be included in each request acknowledgement circuit $MA_j$ to get the same result.

The unit described previously has a processing capacity proportional to the number of processors and the number of modules of which it is composed. If one wishes to increase that capacity, one must then increase the number of processors and modules. Now, the time that passes between the sending of a request by a processor and the time when it receives the response is a function of the number of stages of the shift register, thus, of the number of processors and modules. It will therefore be possible to increase indefinitely the power of the central unit by a simple increase in the number of processors and modules.

Also, according to another aspect of the invention, this problem is solved by providing a system architecture that uses a number of central units, each of which has a limited number of processors and modules.

Each central unit could then work in a local mode with good performance. However, means must be provided for each central unit to be able to communicate with the others.

Figure 11:
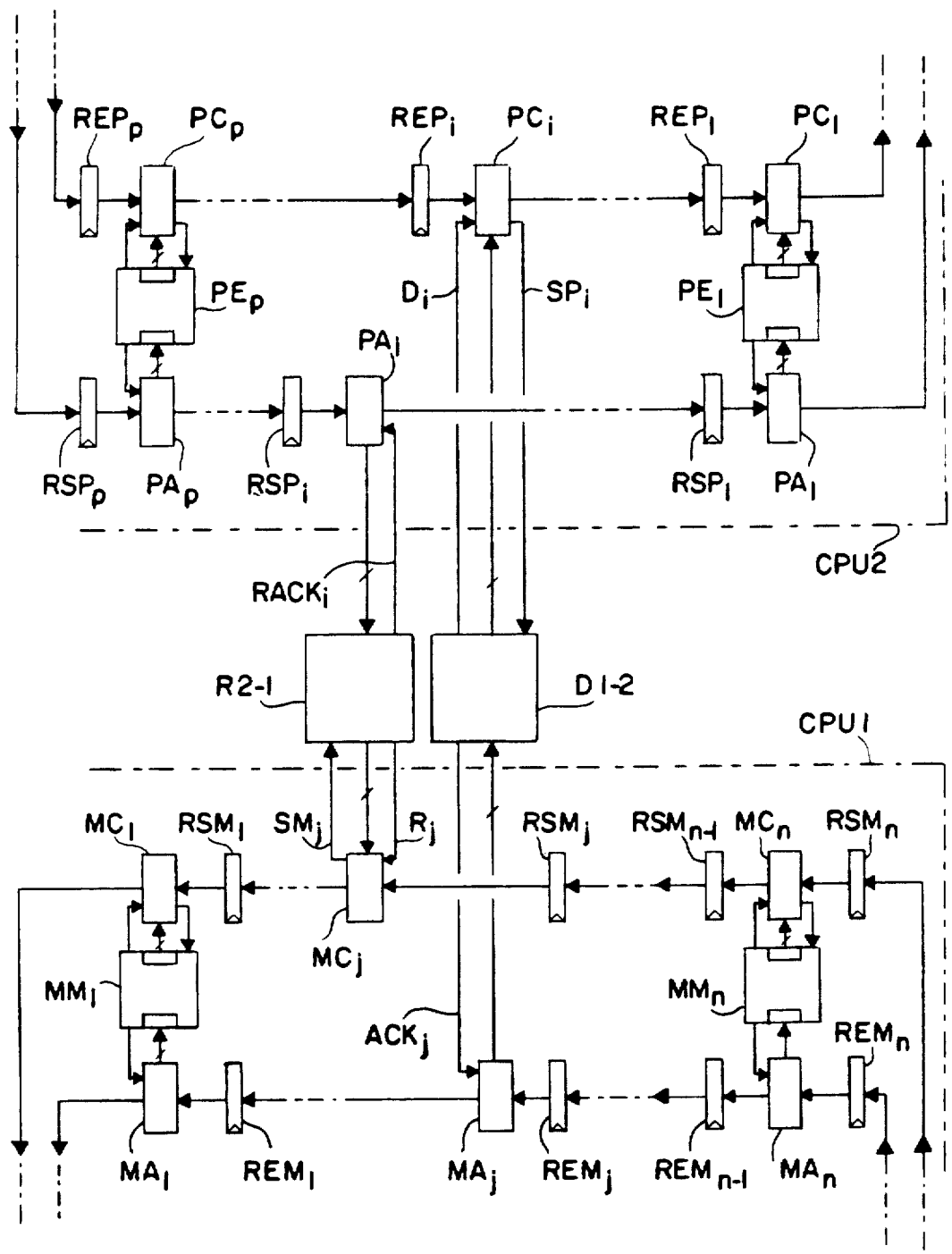
FIG. 11 shows a computer system using several central units according to the invention.

FIG. 11 shows the interconnection between two central units $CPU_1$ and $CPU_2$. The central unit $CPU_1$ is identical in composition to those described previously except that one stage of the input shift register and one stage of the output shift register are used for the interface with another central unit $CPU_2$.

FIG. 11 shows what means are used so that the central unit $CPU_1$ can transmit requests to the central unit $CPU_2$ and so that unit $CPU_2$ can furnish responses to unit $CPU_1$. Thus, the input shift register of the first unit $CPU_1$ communicates with the input shift registers of the second central unit $CPU_2$ via a request acknowledgement circuit $MA_j$ that conforms to one of the preceding descriptions and a request interface circuit D1-2 which itself is connected to a request control circuit $PC_i$ of the second central unit $CPU_2$. Conversely, the output shift register of the second central unit $CPU_2$ communicates with the output shift register of the first central unit $CPU_1$ via a response acknowledgement circuit $PA_i$, a response interface circuit R2-1 and a response control circuit $MC_j$ of the output shift register of the first central unit $CPU_1$.

The interface circuits D1-2 and R2-1 are designed according to the following principle. The request interface D1-2, the second central unit $CPU_2$ and the response interface R2-1 must all be considered by the first central unit $CPU_1$ as if they were a memory module. Conversely, the response interface R2-1, the first central unit $CPU_1$ and the request interface D1-2 must all be considered by the second central unit $CPU_2$ as if they were a processor.

Of course, it is possible to make the roles of the two central units symmetrical by providing another interface pair to exchange the roles of the two central units. It is also possible to have one of the central units communicate with the others and thus form a real network of central units.

These possibilities of interconnections between several units can be used in various ways.

One can, for example, provide for a second central unit $CPU_2$ to be composed solely of memory modules. In this case, $CPU_2$ serves as a secondary memory, while the $CPU_1$ memory modules play the role of working memory. In a general way, it is therefore possible to design a system of hierarchical memories by providing a third unit also composed of modules connected to $CPU_2$, then a fourth unit connected to the third, etc.

In another example of application, the second central unit $CPU_2$ includes specialized processors and then functions as a co-processor capable of farming out specific applications for $CPU_1$.

Figure 12:
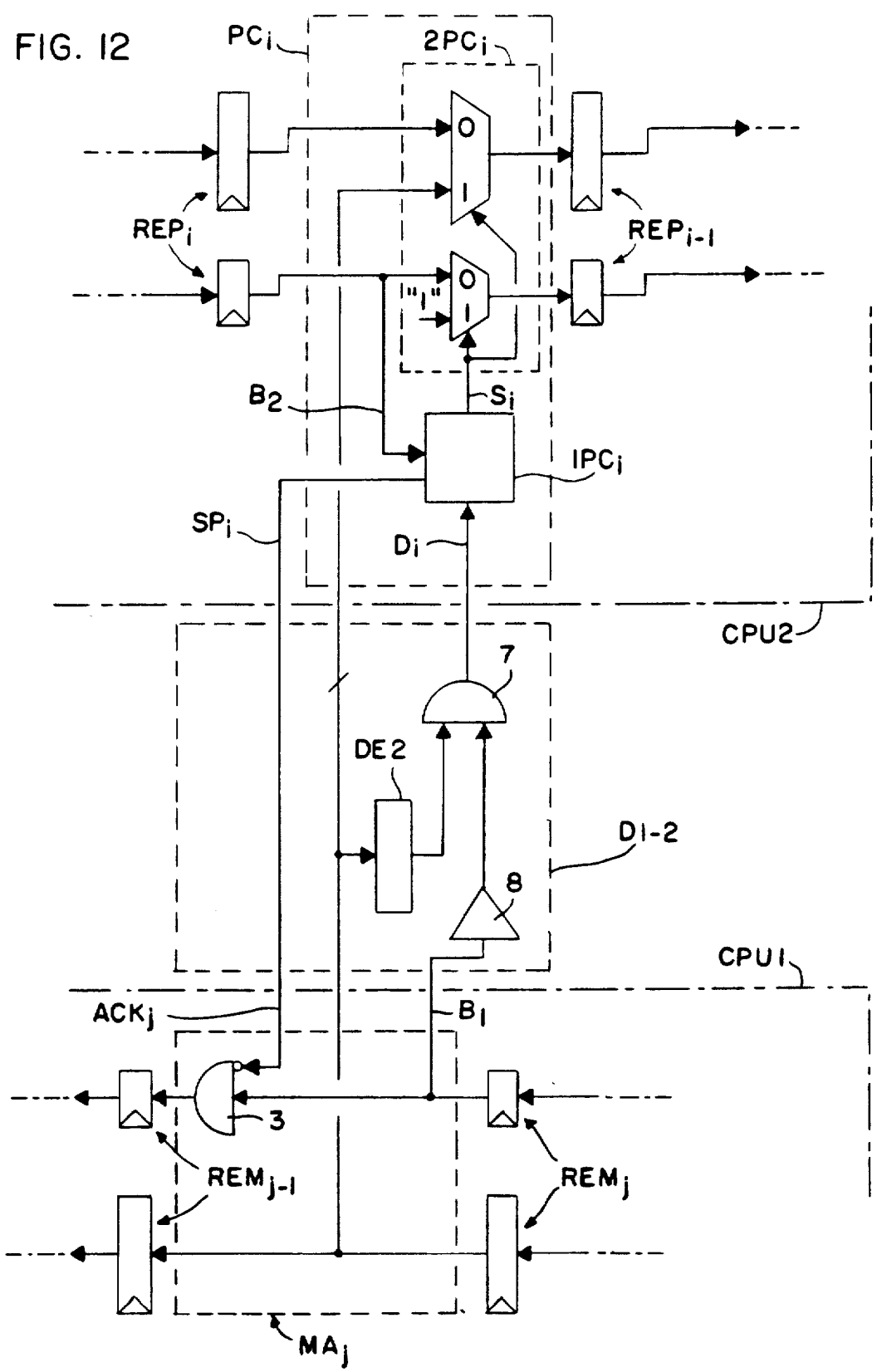
FIGS. 12 and 13 show design details for interface circuits between several central units.

FIG. 12 shows in more detail an example of a design for the connection between the input shift register of the first central unit $CPU_1$ and the input shift register of the central unit $CPU_2$. The elements $PC_i$, $MA_j$, $RE_i$ belonging to the two central units have already been described in relation to FIGS. 3 and 4. The request interface D1-2 includes a decoder $DE_2$ whose input is connected to the output of a stage $RE_j$ of the input shift register of the first central unit $CPU_1$. This decoder receives at input the destination address of the request contained in the stage $RE_j$ and provides a signal whose value indicates whether that address is to go to the second central unit. The interface D1-2 includes an amplifier 8 which receives the request indicator $B_1$ contained in the stage $RE_j$. If the request is indeed addressed to the unit $CPU_2$ and if the request is valid ($B_1=0$), the AND gate 7 which receives the output signals from the decoder $DE_2$ and the amplifier 8 provides the signal $D_i$ applied to the command circuit $1PC_i$ of the request control circuit $PC_i$ of the second central unit $CPU_2$. The meaning of the signal $D_i$ has already been explained in relation to FIG. 3. The signal $SP_i$ provided by the command circuit $1PC_i$ then serves as a signal $ACK_j$ applied to the gate 3. Thus, for the central unit $CPU_1$, the request interface circuit D1-2 acts like the input interface of a memory module. Conversely, for the central unit CPU$_2$, the interface D1-2 acts like the output interface of a processor.

Figure 13:
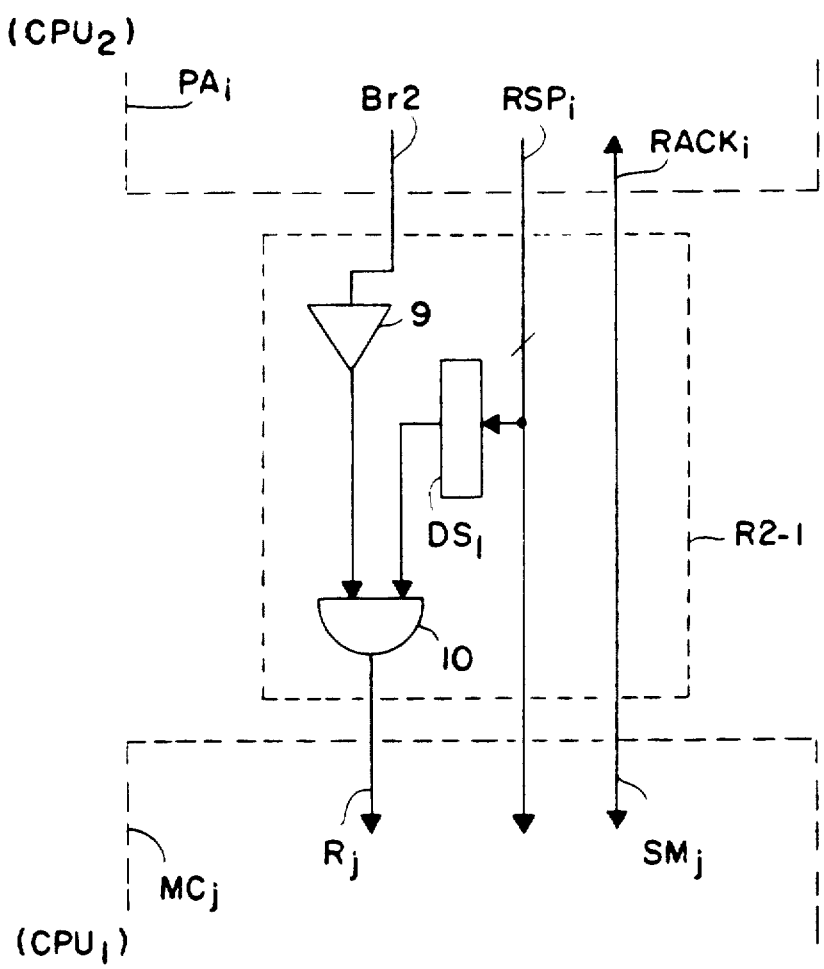

The response interface circuit R2-1 shown in FIG. 13 is identical, from a functional standpoint, to the circuit D1-2.

The response interface circuit R2-1 includes an output decoder DS$_1$, an amplifier 9 and an AND gate 20. The input of the decoder DS$_1$ is connected to the output of a stage RSP$_i$ of the output shift register of the second central unit CPU$_2$ and provides a signal indicating if the response is addressed to the central unit CPU$_1$. The AND gate receives this signal, as well as the output signal from the amplifier 9, which represents the response indicator B$_r$2 extracted from the stage RSP$_i$ of the second central unit CPU$_2$. The AND gate 10 provides the signal R$_j$ already defined in relation to FIG. 5. This signal R$_j$ is applied to the command circuit 1MC$_j$ of a response control circuit MC$_j$ of the first central unit CPU$_1$. In return, this command circuit provides the signal SM$_j$ already defined, which serves as a signal RACK$_i$ applied to the response acknowledgement circuit PA$_i$ of the second central unit CPU$_2$.

Thus, the response interface R2-1 acts as the input interface of a processor for the second central unit CPU$_2$ and as the output interface of a memory module for the central unit CPU$_1$.

Of course, FIGS. 12 and 13 are only design examples whose functional aspect is the most important thing.

We claim:

1. A central unit for a data-processing system, comprising:
   a first plurality of processors with each of said processors having an input terminal and an output terminal and for providing at least one request signal to the output terminal;
   a second plurality of memory modules with each of said memory modules having an input terminal and an output terminal, said memory modules being receptive to the at least one request signal provided from said processors, with each of the at least one request signals being in the form of a first one of a command signal, an address signal and a data signal, and with each of said plurality of memory modules comprising:
   (a) a decoder, coupled to the input terminal of the memory module, for decoding each of the at least one request signals provided thereto; and
   (b) a response circuit, coupled to the output terminal of each memory module for providing at least one response signal in response to each of the at least one request signals;
   an input shift register coupled between the output terminals of said plurality of processors and the input terminals of the plurality of memory modules with said input shift register having at least one stage coupled between the output terminals of said plurality of processors and having at least one stage coupled between the input terminals of each of said plurality of memory modules; and
   an output shift register, coupled between the output terminals of said plurality of memory modules and the input terminals of said plurality of processors, said output shift register having at least one stage coupled between the input terminals of said plurality of processors and having at least one stage coupled between the output terminals of said plurality of memory modules, wherein for each of said plurality of memory modules, wherein for each of said plurality of processors, the number of stages of said input shift register that make it possible to access each of the memory modules is different for each of the memory modules, and wherein for each of said plurality of processors, the total number of stages of the input and output shift registers coupled between each one of said processors and each one of said memory modules is constant and independent of the memory module and the processor.

2. The central unit of claim 1 wherein:
   said input shift register further comprises a first plurality of stages; and
   said output shift register further comprises a second plurality of stages, with at least one of the plurality of processors and at least one of the plurality of memory modules being coupled together through a stage of said input shift register and through a stage of the output shift register, wherein:
   (a) the output terminal of at least one processor is coupled to the output of a corresponding stage of the input shift register;
   (b) the output terminal of at least one memory module is coupled to the output of a corresponding stage of the output shift register;
   (c) the input terminal of the at least one processor is coupled to the output of a corresponding stage of the output shift register; and
   (d) the input terminal of the at least one memory module is coupled to the output of a corresponding stage of the input shift register.

3. The central unit of claim 2 further comprising:
   a plurality of request acknowledgement circuits with each of said request acknowledgement circuits coupled to the input terminal of a corresponding one of said plurality of memory modules and with each of said request acknowledgment circuits disposed to match each request signal provided thereto with a request indicator provided by said input shift register, with said request acknowledgement circuit forcing said request indicator to a first set value when an acknowledgement signal is provided by said memory module indicating that said memory module accepts the request present at its input;
   a plurality of request control circuits with each one of said request control circuits coupled to the output terminal of a corresponding one of said plurality of processors and the corresponding stage of said input shift register and wherein each of said request control circuits comprise:
   a request selection device for transmitting into the corresponding stage of the input shift register placed downstream from said processor which sent the request a first one of:
   (a) a new request available in the output of said processor, if the value of said indicator contained in said stage is equal to said first set value; or
   (b) the request contained in said stage corresponding to said processor if the value of said indicator contained in said stage is not equal to said first set value; and
   a command circuit coupled to said processor and said request selection device for controlling when a request signal from the output of said processor is transmitted to the output of said request selection device;
   and wherein the request indicator corresponding to any new request transferred into said stage downstream being forced to a second set value by said request control circuit, and wherein an output terminal of a first stage of the input shift register is coupled to an input terminal of a last stage of said input shift register via a first one of:
  (a) the request acknowledgement circuit corresponding to the first stage of the input shift register; or
  (b) the request control circuit corresponding to the first stage of the input shift register.

4. The central unit of claim 3, wherein the request control circuit corresponding to a first one of the at least one of said plurality of processors is coupled to the output of a stage of said input shift register placed upstream from the stage of the input shift register corresponding to the first one of the at least one of said plurality of processors, and wherein said request control circuit commands said request selection device to transmit a new request from the first one of the at least one of said plurality of processors to the input of the stage of the input shift register placed downstream from said processor when a first one of the following conditions is met:
  a) said stage upstream is coupled to a first one of said plurality of memory modules and includes a request indicator having a value equal to a first one of said first set value, or said second set value and the request contained in said stage upstream addresses said first memory module and said first memory module is available to receive said request; or
  b) said stage upstream is coupled to a first one of said plurality of processors and a first one of said plurality of request indicators having a value equal to said first set value and no request is ready in the output of said first one of said plurality of processors.

5. The central unit of claim 4, further comprising:
a plurality of response acknowledgement circuits with each of said response acknowledgment circuits coupled to the input terminal of a corresponding one of said plurality of processors with each of said response acknowledgment circuits disposed to match each response signal provided thereto with a response indicator provided by said output shift register, with each of said response acknowledgement circuits forcing the corresponding response indicator to a first set value when a response acknowledgement signal is provided by said processor indicating that it accepts the response present at its input;
a plurality of response control circuits with each one of said response control circuits comprising:
  (a) a response selection device for transmitting into the stage of the output shift register placed downstream from said memory module a first one of:
    (i) a response available in the output of said memory module if the value of said response indicator contained in said stage is equal to the first set value; or
    (ii) the response contained in said stage associated with said memory module if the value of said response indicator contained in said stage is equal to the second set value;
  with the response indicator corresponding to any new response transferred into said stage downstream being forced to the second set value by said response control circuit, wherein the output of the first stage of the output shift register is connected to the input of the last stage of said output shift register via a first one of:
    (a) the response acknowledgement circuit; or
    (b) the response control circuit corresponding to the first stage of the input shift register.

6. The central unit of claim 5, wherein each of the response control circuits coupled to a corresponding one of the plurality of memory modules is connected to the output of the stage placed upstream from the stage of the output shift register corresponding to said memory module, wherein each of said response control circuits commands the corresponding response selection device to authorize the transfer of a new response from said memory module to the input of the stage of the output shift register placed downstream from said memory module when a first one of the following conditions is met:
  (a) said stage upstream is coupled to a first one of said plurality of processors and contains a response indicator having a value equal to said first set value, or having a value equal to said second set value and the response contained in said stage upstream is addressed to said processor and said processor is available to receive said response; or
  (b) said stage upstream is coupled to a first one of said plurality of memory modules and contains a response indicator whose value is equal to said first set value and no response is ready in the output of the said memory module upstream.

7. The central unit of claim 6 wherein the requests contain in parallel a function code serving to define the operation to be performed in one of the memory modules, address data, data in the case of a write and a tag of origin in the case of a read, with said tag of origin representing the identity of the processor which sends the request, and wherein the responses contain in parallel a destination tag corresponding to a first one of the tag of origin for the request considered, data in the case of a read, or an error report.

8. A data-processing system comprising:
a plurality of central units wherein a first one of said plurality of central units transmits at least one request signal to a second one of said plurality of central units and wherein each of said central units comprises:
  (a) a first plurality of processors with each of said processors having an input terminal and an output terminal and for providing at least one request signal at the output terminal;
  (b) a second plurality of memory modules each having an input terminal and an output terminal with at least one of said plurality of memory modules being receptive to the at least one request signal provided from said processors, and with each memory module comprising:
    (i) a decoder circuit coupled to the input terminal for decoding request signals provided thereto; and
    (ii) a response circuit coupled to the output terminal for providing at least one response signal to each of the at least one request signals fed from one of the plurality of processors to the input terminal of at least one of said plurality of memory modules;
  (c) an input shift register, coupled between the output terminals of said plurality of processors and the input terminals of said plurality of memory modules, for transmitting each request signal from each of the plurality of processors to at least one of said plurality of memory modules;

(d) an output shift register, coupled between the input terminals of said plurality of processors and the output terminals of said plurality of memory modules, for transmitting a response signal provided by each of said plurality of memory modules to the input terminal of at least one of the plurality of processors and wherein for each of said plurality of processors, the number of stages of said input shift register that make it possible to access the memory modules is different for each of the memory modules, and wherein for each of said plurality of processors, the total number of stages of the input and output shift registers corresponding to each of said memory modules is constant and independent of the memory modules and the corresponding processor;

a request interface unit coupled between said first central unit and said second central unit and disposed to provide the input interface of a first one of said plurality of memory modules of said first central unit and as the output interface of a first one of said plurality of processors of said second central unit and wherein said second central unit transmits at least one response signal to a third one of said plurality of central units; and a response interface circuit is disposed to provide an input interface circuit of a first one of said plurality of processors of the second central unit and an output interface circuit of a first one of said plurality of memory modules of said third one of said plurality of central units.

9. The data-processing system of claim 8, wherein:

said input interface circuit comprises a decoder having an input terminal connected to an output of a stage of the input shift register of the first central unit, with said decoder making it possible to detect whether the request contained in said stage is addressed to said second central unit; and the response interface circuit comprises an output decoder having an input terminal connected to the output of a stage of the output decoder making it possible to detect whether the response contained in said stage of the output shift register of the second central unit is addressed to the central unit to which said output decoder is connected.

* * * * *

UNITED STATES PATENT AND TRADEMARK OFFICE
CERTIFICATE OF CORRECTION

PATENT NO. : 5,170,483
DATED : December 8, 1992
INVENTOR(S) : Georges-Keryvel, et al.

It is certified that error appears in the above-indentified patent and that said Letters Patent is hereby corrected as shown below:

Column 5, line 43, "$REM_j$ or $REM_i$" should read --$REM_j$ or $REP_i$--

Column 5, line 50, "$RSP_{i-1}$, $RSM_{n-1}$, ..." should read --$RSP_{i-1}$, $RSP_i$, ...--.

Column 14, line 8, "of..the" should read --of the--.

Column 15, line 12, "as well as ,the" should read --as well as the--.

Column 15, lines 67/68, delete "wherein for each of said plurality of memory modules,".

Column 19, line 17, "modules" should read --module--.

Signed and Sealed this

Seventeenth Day of May, 1994

Attest:

BRUCE LEHMAN

Attesting Officer    Commissioner of Patents and Trademarks